March 21, 1950 H. N. STEPHAN 2,501,421
MACHINE TOOL SPINDLE
Filed March 29, 1949 2 Sheets-Sheet 1

INVENTOR.
HALLIS N. STEPHAN
BY Hudson, Boughton,
Williams, David & Hoffmann.
ATTORNEYS March 21, 1950     H. N. STEPHAN     2,501,421
MACHINE TOOL SPINDLE Filed March 29, 1949     2 Sheets-Sheet 2

INVENTOR.
HALLIS N. STEPHAN
BY Hudson, Boughton,
Williams, David & Hoffmann.
ATTORNEYS Patented Mar. 21, 1950

2,501,421

UNITED STATES PATENT OFFICE 2,501,421

MACHINE TOOL SPINDLE

Hallis N. Stephan, Cleveland Heights, Ohio, assignor to The New Britain Machine Company, New Britain, Conn., a corporation of Connecticut Application March 29, 1949, Serial No. 84,226

8 Claims. (Cl. 279—1)

The present invention relates to machine tools and, more particularly, to the tool spindles thereof and especially to horizontal boring machine spindles and adapters for connecting tools, bars, arbors, etc., having tapered shanks constructed in accordance with standard milling machine practice to standard horizontal boring machine spindles.

The tool end of the conventional spindle of a horizontal boring machine, which spindle is usually several feet in length, is provided with a tapered socket into which the tapered shank of the tool, bar, etc., fits and is bound to secure the same to the spindle. The tool or more properly the shank of the tool, is bound or firmly seated in the tapered socket of the spindle by a holdback key and is driven out of the spindle by a drift pin or key. During operation of the machine, dirt and chips accumulate in the holdback and drift key holes or slots and when the spindle is retracted sufficiently, this dirt is carried into the spindle sleeve or quill and its bearings which in time become marred and worn and no longer hold the spindle in proper position with respect to the rest of the machine. The end of the spindle also becomes marred from the pounding in and out of the holdback and drift pins or keys.

Besides other disadvantages, conventional horizontal boring machine spindles do not permit arbors, tools, bars, etc., having standard milling machine tapered shanks to be attached to the spindle, thus requiring substantially duplicate sets of arbors, tools, etc., for each type of machine. The tapered shanks of conventional milling machine arbors, tools, bars, etc., are secured or bound to the spindle of the milling machine by a bar or rod which extends through the spindle and has a threaded end that screws into a tapped hole in the end of the tapered shank of the tool or bar. Similar bars or rods cannot be used with horizontal boring, milling and drilling machines because of the greater length of their spindles and the fact that the spindles are often fed lengthwise during cutting. Other devices intended to permit the use of conventional milling machine arbors, sleeves, tools, etc., on boring machines have been proposed but they have not proved satisfactory and so have not attained any appreciable commercial success.

The principal object of the present invention is the provision of a new and improved spindle for horizontal boring machines which will permit tools, bars, etc., and preferably having conventional milling machine tapered shanks or shanks similar thereto, to be connected thereto, the tool end of which spindle will be substantially smooth and free from holdback and drift key slots and, therefore, will not tend to carry dirt into its sleeve or quill and bearings when withdrawn into its sleeve or quill.

Another object of the invention is the provision of a novel and improved spindle of the character referred to, the binder mechanism of which in addition to being simple and rugged in construction is self-contained within the spindle with no openings to allow dirt to get into and foul the mechanism and in addition to being capable of binding the tapered shank of the tool, bar, etc., in the spindle will eject the tapered shank when it is desired to remove the tool.

Another object of the invention is the provision of a novel and improved spindle of the character referred to, the binder mechanism of which includes a "shock absorber" means for preventing damage thereto in the event the tapered shank of the tool, bar, etc., is thrown roughly into the socket in the end of the spindle.

Another object of the invention is the provision of a novel and improved spindle for any type of machine which will permit arbors, tools, bars, etc., having tapped holes in the ends of their tapered shanks, such as, conventional type milling machine arbors, tools, etc., to be attached thereto, without the necessity of having a threaded bar or the like extending through the spindle to the rear end of the spindle.

A further object of the invention is the provision of a novel and improved short spindle in the nature of an adapter having a tool-receiving nose or end of the character referred to and a tapered shank adapted to be connected to a conventional boring machine spindle for attaching tools that can be connected thereto to boring machine spindles.

The invention resides in certain constructions and combinations and arrangements of parts and further objects and advantages of the invention will be apparent to those skilled in the art to which the invention relates from the following description of the preferred embodiment described with reference to the accompanying drawings forming a part of this specification, and in which Fig. 1 is a fragmentary, elevational view of a spindle embodying the present invention;

As previously stated, and as disclosed in my copending application for Machine tool spindle, S. N. 33,307, filed June 16, 1948, now abandoned, of which the instant application is a continuation-in-part, the spindle of the present invention may be used with different types of machine tools but is especially applicable to boring machine spindles or bars as it is substantially free of openings which collect chips and dirt and carry them back into the spindle sleeve and bearings when the spindle is withdrawn into the sleeve. Regardless of the type of machine in which the spindle is used or whether it is used as an adapter, the tool receiving end or nose is the same.

Figure 2:
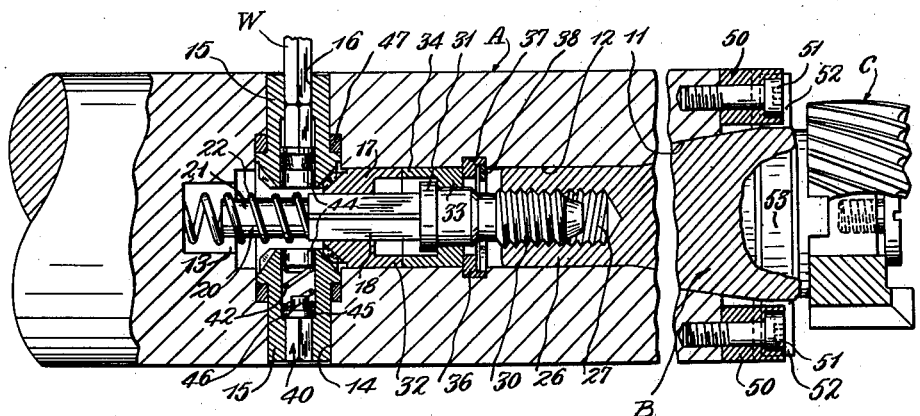
Fig. 2 is a fragmentary, enlarged, sectional view approximately on the line 2—2 of Figs. 1 and 3, with portions in elevation and showing a milling machine arbor being attached thereto.

Referring to the drawings, the reference character A designates a machine tool spindle embodying the present invention. The nose of the spindle is provided with a tapered socket 11 terminating in a cylindrical bore 12, the diameter of which in the embodiments shown is about one-third that of the spindle and the depth of which is approximately equal to that of the tapered socket 11. The bore 12 communicates with a short, coaxial bore 13 and with a transverse bore 14 having portions of different diameter for providing a seat for and limiting the outward movement of bevel or miter gears 15 inserted into or assembled in the bore 14 through the tapered socket 11 and the bore 12 before the other parts to be referred to are assembled therein. The radially outer ends of the gears 15 are flush or substantially flush with the surface of the spindle and are provided with a square socket 16 for the reception of a wrench W, see Fig. 2. The wrench W is preferably one used in standard socket head screws, so as to eliminate the necessity of providing a special wrench. The sockets 16 provide a convenient driving connection for rotating the gears 15.

The gears 11 are continuously in mesh with a bevel or miter gear 17 located within the bore 12 and slidable on a square section 18 of a longitudinally extending rod 20, the rear end of which projects into the bore 13. Alternatively a conventional spline section may be substituted for the square section 18 shown. The left-hand or rear end of the rod 20 is provided with a cylindrical section 21 which pilots a compression spring 22 in the bottom of the bore 13 and interposed between the end of the square section 18 of the rod 20 and the bottom of the bore. The pilot 21 terminates short of the bottom of the bore 13 to allow the rod 20 to move rearwardly in the spindle and the spring 22 to act as a "shock absorber" if the shank of the tool is thrown roughly into the socket and against the front end of the rod 20.

The reference character B designates a conventional milling machine arbor, the tapered shank 25 of which is provided with a "steep" taper corresponding to the taper of the tapered socket 11 of the spindle nose A. The rear cylindrical portion or pilot 26 of the arbor which projects a short distance into the bore 12 is provided with the conventional tapped or threaded hole 27 in its rear end or face. A conventional milling cutter C is connected to the arbor B in the usual manner.

The arbor B is drawn into the socket 11 to securely affix the arbor in the spindle by the rod 20, the front end of which is provided with a threaded section 30 adapted to be screwed into and out of the threaded hole 27 of the arbor upon rotation of the rod 20 in the proper direction by the gears 15, 17. Movement of the rod 20 toward the nose end of the spindle is limited by an integral collar 31 on the rod 20 immediately to the right of the squared section 18 and spaced a short distance behind the threaded portion 30. The collar 31 is located in adjoining bores in the hub 32 of the gear 17 and the member 34 to permit the rod 20 to move toward the rear of the spindle until the rear end of the cylindrical portion 21 strikes or engages the bottom of the hole 13. When the rod 20 moves toward the tool end of the spindle, the collar 31 abuts against an internal flange 33 on the left-hand end of a tubular sleeve 34 preferably having a forced fit in the bore 12.

Movement of the sleeve 34 toward the tool end of the spindle is limited or rather prevented by a divided ring 36 held in position in an internal groove 37 opening into the bore 12 by a snap ring 38 against which ring 36 the end of the sleeve 34 abuts. The flange 33 which is of substantial thickness forms a bearing for the front part of the rod 20. The diameter of the collar 31 is preferably slightly less than the internal diameter of the sleeve 34; however, the collar 31 may be constructed to have a sliding fit within the sleeve 34, if desired.

The spindle A is solid and the size of the gears 15, etc., with respect to the opening in the end of the spindle is such that the parts can all be assembled through the front end of the spindle, thus avoiding the necessity of providing a large hole or opening in the side of the spindle or one extending the length of the spindle. With the gears 15 and the spring 22 positioned in their respective bores, the gear 17 and the sleeve 34 are assembled on the rod 20 and the assembly inserted into the socket of the spindle. The sleeve 34 is pressed into the bore 12 until the divided ring 36 and the snap ring 38 can be positioned in the groove 37 provided therefor, at which time the miter gears 15, 17 will be properly meshed and the spring 22 slightly compressed. The sleeve 34 prevents dirt from entering the binding mechanism to the right thereof through the socket 11. Dirt is prevented from entering the spindle through the socket holes 16 in the gears 15 by members 40, each comprising a square shank portion 41 slidable in one of the sockets 16. The members 40 are normally urged in a radially outward direction by springs 42 located in counterbores 43 in the inner ends of the gears 15 and interposed between plugs 44 and collars 45 adjacent to the inner ends of the members 40. The collars 45 limit the outward movement of the members 40 to a position where their outer ends are flush with the outer ends of the gears 15. Pivots 46 on the inner ends of the members 40 help to maintain the springs 42 centered and limit movement of the members 40 in a radially inward direction by engaging the plugs 44. The reference characters 47 designate bearing members for taking the thrust of the gears 15.

If the arbor is thrown roughly into the socket 11 so that the rear end of the arbor strikes the front end of the rod 20, the rod will retract into the spindle a slight amount against the action of the spring 22, thus preventing serious injury to either the arbor or the rod 20. After the arbor is placed in the socket, one of the gears 15 is manually rotated by a suitable wrench, such as the wrench W, to screw the threaded end 30 of the rod 20 into the threaded opening 27 in the arbor and draw the tapered shank 25 of the arbor into the tapered socket 11 of the spindle, and bind the parts together. The binding pressure is taken by the flange 33 of the sleeve 34 and the ring 36.

When it is desired to remove the arbor, one of the gears 15 is rotated in the opposite direction to unscrew the threaded portion 30 of the rod 20 from the arbor. If the arbor is stuck in the socket 11, which will be the usual case, the rod 20 moves back further into the spindle until the rear end of the part 21 of the rod strikes the bottom of the bore 13 which acts as an abutment and prevents further movement of the rod toward the rear. The parts are so proportioned that this occurs while a substantial part of the threaded portion 30 of the rod 20 is still engaged with the threads of the arbor. Continued rotation of the gear 15 in the same direction after movement of the rod 20 toward the rear of the spindle has been arrested causes the arbor to be forced forwardly in the socket or ejected therefrom. Since there is a substantial threaded engagement between the threads of the arbor and those of the rod 20 at the time rearward movement of the rod is arrested, considerable force can be applied to release the arbor without damage.

In the embodiment shown, the nose of the spindle is provided with driving keys 50 to engage within the usual driving slots in the arbor B. The keys 50 are set in slots formed in the nose of the spindle and are held therein by screws 51.

The permissible longitudinal movement of the rod 20, and the length of the threaded portion 30, etc., are preferably so proportioned that when the arbor B is initially inserted in the socket 11 with its rear end engaging the rod 20, the arbor and rod can be pushed rearwardly and the spring 22 compressed until the keys 50 engage or catch in the usual slots 52 in the usual arbor flange 53. This permits the operator to thereafter give his entire attention to manipulation of the wrench W, otherwise he is required to attend to the aligning of the slots 52 in the flange 53 with the keys 50 while manipulating the wrench W. As previously stated, when it is desired to remove the arbor from the spindle or bar A, the wrench W is inserted and the rod 20 rotated thereby in the opposite direction; that is, in the direction to unscrew the threaded shank 30 from the arbor B. The arbor B usually sticks or binds in the socket 11 because of the wedging action between the tapered shank of the arbor and the taper of the socket. In this event, rotation of the rod 20 in the direction mentioned will cause the rod 20 to move rearwardly until the end of the cylindrical portion 21 strikes or seats against the bottom of the bore 13. Continued rotation of the rod 20 after the end of the rod has seated against the bottom of the bore 13 will cause the arbor to be forced out of the socket.

The instant the binding action between the arbor and the socket is broken, the spring 22 will snap or throw the arbor forward and it is preferable to have the parts so proportioned that when this occurs the threads 30 are still engaged with the threads in the bore 27, otherwise the arbor may be thrown clear of the spindle and the tool or work damaged. It will also be apparent that when the binding action between the arbor and socket is being broken by rotation of the rod 20, there should be a substantial thread engagement between the rod 20 and the arbor B so as to prevent injury to the threads by the force or pressure applied therethrough.

The socket of the spindle shown is provided with a standard milling machine taper so as to permit the use of standard milling machine arbors, tools, bars, etc., but it is to be understood that any suitable taper can be used. Further changes in the specific construction shown may be made without departing from the invention; for example, the pilot of the arbor may be provided with an externally threaded bar and the front end of the rod 20 with an internally threaded socket or a binding type bayonet connection may be used between the arbor and the binder rod 20; the spring 22 may be replaced by a spring recessed in the end of the rod 20; a single gear similar to one of the gears 15 may be used, see Fig. 5. Alternatively, three or more gears 15 may be used, if desired. The gears 15 may be formed as a part of a detachable wrench and inserted through a suitable hole in the spindle when it is desired to rotate the gear 17; however, this is not the preferred construction because it would provide a pocket for the accumulation of chips and dirt.

Figure 1:
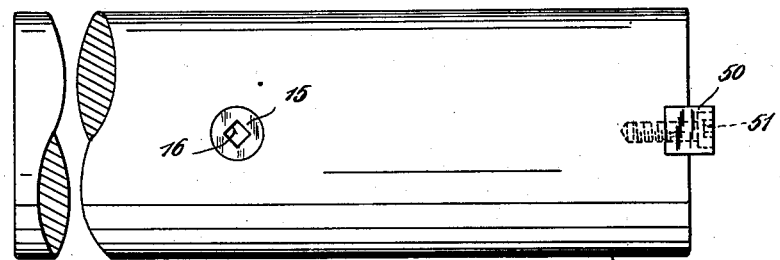
Figure 3:
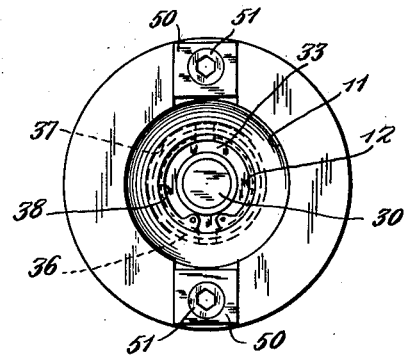
Fig. 3 is an end view of the spindle shown in Fig. 1, looking from the right.
Figure 4:
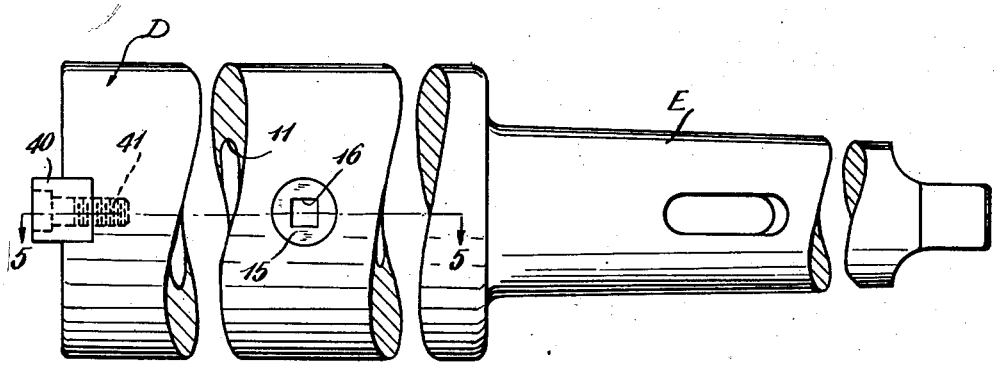
Fig. 4 is a view similar to Fig. 1 but showing a different construction.
Figure 5:
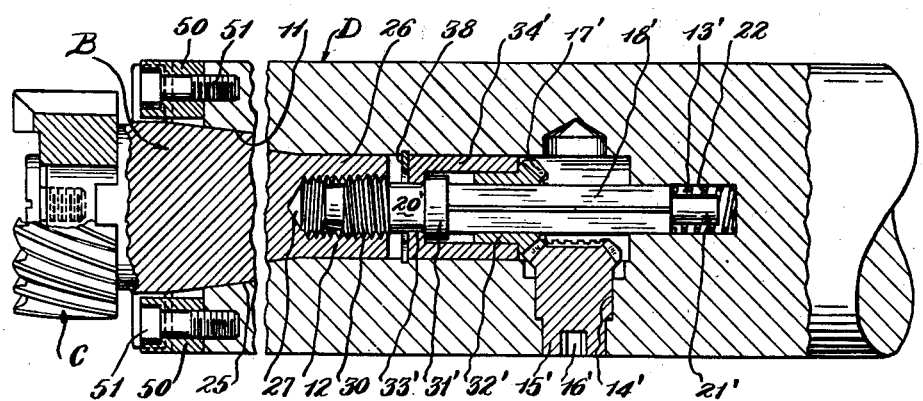
Fig. 5 is a fragmentary, sectional view approximately on the line 5—5 of Figs. 4 and 6, with portions in elevation and showing a milling machine arbor attached thereto.
Figure 6:
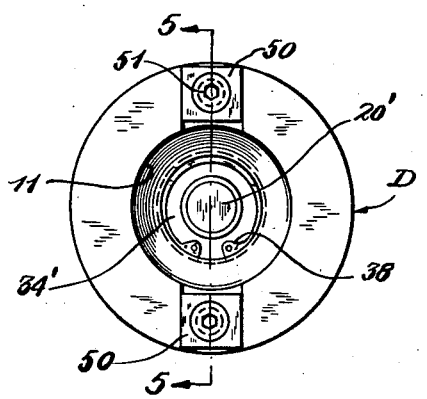
Fig. 6 is an end view of the spindle shown in Fig. 4.

In Figs. 4 to 6, the invention is shown incorporated in an adapter for attaching tools or arbors having standard milling machine tapered shanks to the nose end of a standard boring machine spindle. The adapter shown comprises a short, cylindrical spindle section D incorporating the binder mechanism etc., and a tapered shank E constructed in accordance with standard boring machine practice. The binder mechanism shown is similar to but slightly different in its details of construction from that shown in Figs. 1 to 3 and heretofore described and will not be described in detail. Suffice it to say that the duplicate parts are designated by the same reference characters and the corresponding but slightly differently constructed parts by the same reference character with a prime mark affixed thereto.

From the foregoing, it will be apparent that there has been provided a novel and improved spindle for machine tools and the like, the nose of which is smooth and free from openings, and has incorporated therein binder mechanism of improved form which is self-contained within the nose of the spindle. The binder mechanism is simple and rigid in construction, reliable in operation, sealed against the entrance of dirt, chips, etc., can be used as an ejector, and extends or reaches back from the tool end of the spindle a small distance, as shown; a distance equal to about twice the spindle diameter. While the preferred embodiment has been shown and described in considerable detail, the invention is not limited to the construction shown and the alternative constructions mentioned, and it is my intention to cover hereby all modifications and uses thereof which come within the practice of those skilled in the art to which the invention relates and within the scope of the appended claims.

Having thus described my invention, I claim:

1. In a solid machine tool spindle having a longitudinally extending aperture opening into its forward end the forward portion of which aperture forms a socket for the reception of a device to be attached to the spindle, the combination of a member slidably and rotatably supported in said aperture and provided at its forward end with means adapted to connect it with said device, means for limiting the movement of said member in said aperture, and means for rotating said member.

2. In a solid machine tool spindle having a longitudinally extending aperture opening into its forward end and the forward portion of which aperture forms a socket for the reception of a device to be attached to the spindle, the combination of a member slidably and rotatably supported in said aperture and provided at its forward end with means adapted to connect it with said device, means for limiting the movement of said member in said aperture, means for continuously and yieldably urging said member toward the forward end of the spindle, and means for rotating said member.

3. In a solid machine tool spindle having a longitudinally extending aperture opening into its forward end the forward portion of which aperture forms a socket for the reception of a device to be attached to the spindle, the combination of a member slidably and rotatably supported in said aperture and provided at its forward end with means adapted to connect it with said device, means for limiting the movement of said member in said aperture, and means for rotating said member, said last-named means including a gear rotatably supported in said aperture and operatively connected to said member in a manner such that the latter is slidable but non-rotatable relative to said gear.

4. In a solid machine tool spindle having a longitudinally extending aperture opening into its forward end the forward portion of which aperture forms a socket for the reception of a device to be attached to the spindle, the combination of a rotatable member in said aperture provided at its forward end with means adapted to connect it with said device, a gear located in said aperture and keyed to said member, the maximum transverse dimension of said member and said gear being less than the minimum inside diameter of said aperture intermediate said gear and the end of said spindle, means in said spindle for limiting the movement of said member in said aperture toward the open end thereof, and means for rotating said gear.

5. In a solid machine tool spindle having a longitudinally extending aperture opening into its forward end the forward portion of which aperture forms a socket for the reception of a device to be attached to the spindle, the combination of a member slidably and rotatably supported in the rear portion of said aperture and provided at its forward end with means adapted to connect it with said device, means for limiting the movement of said member in said aperture, a gear slidably keyed to said member, a second gear in mesh with said first-named gear and rotatably supported in said spindle, and means for rotating said second gear having its outer end substantially flush with the exterior of the spindle.

6. In a solid machine tool spindle having a longitudinally extending aperture opening into its forward end the forward section of which aperture is tapered and forms a tapered socket for the reception of a device to be attached to the spindle and having a tapered shank, the combination of a member slidably and rotatably suported in the rear portion of said aperture and provided at its forward end with threads adapted to connect it with said device, means for limiting the longitudinal movement of said member in said aperture, and means for rotating said member.

7. In a solid machine tool spindle having a longitudinally extending aperture opening into its forward end the forward section of which aperture is tapered and forms a tapered socket for the reception of a device to be attached to the spindle and having a tapered shank, the combination of a member slidably and rotatably supported in said aperture to the rear of said taper and provided at its forward end with threads adapted to connect it with said device, means for limiting the longitudinal movement of said member in said aperture, a spring interposed between abutments on said member and said spindle for continuously and yieldably urging said member toward the open end of said aperture, and means for rotating said member.

8. In a solid machine tool spindle having a longitudinally extending aperture of limited depth opening into its forward end the forward end or section of which aperture is tapered and forms a tapered socket for the reception of a device to be attached to the spindle and having a tapered shank, the combination of a rotatable member in said aperture to the rear of said taper and provided at its forward end with threads adapted to connect it with said device, a gear slidably keyed to said member, said member and said gear being assemblable and disassemblable through the forward end of said aperture, means for limiting the longitudinal movement of said member in said aperture, and means for rotating said gear.

HALLIS N. STEPHAN.

REFERENCES CITED

The following references are of record in the file of this patent:

UNITED STATES PATENTS

| Number | Name | Date |
|---|---|---|
| 1,214,773 | Gairing | Feb. 6, 1917 |
| 1,298,196 | Gairing | Mar. 25, 1919 |
| 1,360,016 | Porter | Nov. 23, 1920 |
| 2,383,688 | Suter | Aug. 28, 1945 |

FOREIGN PATENTS

| Number | Country | Date |
|---|---|---|
| 213,135 | Great Britain | Mar. 27, 1924 |